US012257598B2

(12) United States Patent
Li et al.

(10) Patent No.: US 12,257,598 B2
(45) Date of Patent: Mar. 25, 2025

(54) BATCH COATING APPARATUS AND BATCH COATING METHOD

(71) Applicant: SHENZHEN SISENSING TECHNOLOGY CO., LTD., Shenzhen (CN)

(72) Inventors: Yunfeng Li, Shenzhen (CN); Bin Xia, Shenzhen (CN); Mingsong Han, Shenzhen (CN)

(73) Assignee: SHENZHEN SISENSING CO., LTD., Shenzhen (CN)

(*) Notice: Subject to any disclaimer, the term of this patent is extended or adjusted under 35 U.S.C. 154(b) by 169 days.

(21) Appl. No.: 18/069,314

(22) Filed: Dec. 21, 2022

(65) Prior Publication Data

US 2023/0182163 A1 Jun. 15, 2023

Related U.S. Application Data

(63) Continuation of application No. PCT/CN2021/133304, filed on Nov. 25, 2021.

(30) Foreign Application Priority Data

Mar. 18, 2021 (CN) ......................... 202110291066.0

(51) Int. Cl.
*B05C 3/10* (2006.01)
*B05C 11/10* (2006.01)
(Continued)

(52) U.S. Cl.
CPC ............ *B05C 3/10* (2013.01); *B05C 11/1002* (2013.01); *B05C 13/02* (2013.01); *B05D 1/18* (2013.01)

(58) Field of Classification Search
CPC ................................. B05C 3/10; B05C 13/02
See application file for complete search history.

(56) References Cited

U.S. PATENT DOCUMENTS 2,803,257 A * 8/1957 Cozzoli ..................... B08B 9/28 134/143
4,358,483 A * 11/1982 Waugh ..................... B05D 1/32 427/389.7

(Continued)

FOREIGN PATENT DOCUMENTS

CN 109848002 A * 6/2019
CN 214682591 U * 11/2021

(Continued)

OTHER PUBLICATIONS

International Search Report issued by China National Intellectual Property Administration (CNIPA), issued on Mar. 3, 2022, regarding PCT/CN2021/133304.

*Primary Examiner* — Cachet I Proctor
(74) *Attorney, Agent, or Firm* — AVEK IP, LLC

(57) ABSTRACT

Some embodiments of the disclosure describe a batch coating apparatus. In some examples, the batch coating apparatus includes a fixing mechanism, a liquid holding mechanism, a liquid injection mechanism and a control device. The fixing mechanism includes a plurality of fixing portions for fixing work-pieces to be coated. The liquid holding mechanism includes a plurality of liquid tanks arranged side by side. The liquid injection mechanism includes a liquid storage portion and an infusion portion. The control device is configured to control at least one of a relative movement between the fixing mechanism and the liquid holding mechanism and a relative movement between the liquid holding mechanism and the liquid injection mechanism. The control device is configured to control the liquid injection mechanism to supply the coating liquid via the infusion portion.

9 Claims, 7 Drawing Sheets

(51) Int. Cl.
*B05C 13/02* (2006.01)
*B05D 1/18* (2006.01)

(56) References Cited

U.S. PATENT DOCUMENTS

| | | | | | |
|---|---|---|---|---|---|
| 5,354,379 | A * | 10/1994 | Milbourn | B41M 7/0045 15/100 |
| 2003/0168005 | A1 * | 9/2003 | Reinhardt | B65G 49/0454 118/423 |
| 2006/0210699 | A1 * | 9/2006 | Collins | B05C 3/09 118/400 |
| 2007/0221123 | A1 * | 9/2007 | Anderson | B05C 3/09 118/44 |
| 2007/0222132 | A1 * | 9/2007 | Anderson | B05C 3/109 269/37 |
| 2009/0017210 | A1 * | 1/2009 | Andrianov | A61K 9/0021 118/712 |
| 2011/0014386 | A1 * | 1/2011 | Dillon | B05C 3/02 118/421 |
| 2019/0070630 | A1 * | 3/2019 | Surma | B05D 1/18 |

FOREIGN PATENT DOCUMENTS

| | | | | |
|---|---|---|---|---|
| EP | 792697 | A1 * | 9/1997 | B05C 3/09 |
| JP | 2000102759 | A | 4/2000 | |
| JP | 2001000907 | A | 1/2001 | |

* cited by examiner

Before Immersion

After Immersion

BATCH COATING APPARATUS AND BATCH COATING METHOD

CROSS REFERENCE TO RELATED APPLICATIONS

This application is a continuation of, and claims priority to International Application No. PCT/CN2021/133304, filed on Nov. 25, 2021, which claims priority to Chinese Patent Application No. 202110291066.0, field on Mar. 18, 2021, the disclosure of which are incorporated by reference herein in their entireties.

FIELD OF THE DISCLOSURE

The disclosure relates generally to the field of coating. More specifically, the disclosure relates to batch coating apparatuses and batch coating methods.

BACKGROUND

In the field of medical instruments, since medical instruments usually come into contact with human body, biocompatibility treatment is needed in production. For example, when an implantable blood glucose monitor is used for blood glucose monitoring, a sensing probe of the blood glucose monitor is often embedded in a subcutaneous tissue of an examinee, In order to reduce the immune response caused by the implantation of the sensing probe into the subcutaneous tissue, a working electrode of the sensing probe usually needs to be coated with a biocompatible membrane.

In the prior art, a pulling coating apparatus usually dip a sensor electrode into a previously prepared sol, then pulling the sensor electrode out of the sol to form a uniform liquid film on the surface of the sensor electrode, with the rapid evaporation of a solvent in the sol, a uniform thin film is formed on the surface of the sensor electrode infiltrated by the sol.

However, there are some problems in the process of batch coating production, due to the large number of variables affecting parameters in the coating process, which may lead to large differences in the thickness, opacity and color of the film-forming layer on the surface of each sensor electrode at last, and it is difficult to ensure the uniformity of the coating film. Therefore, there is a need for a coating apparatus to improve the uniformity and batch coating.

SUMMARY

The following presents a simplified summary of the invention in order to provide a basic understanding of some aspects of the invention. This summary is not an extensive overview of the invention. It is not intended to identify critical elements or to delineate the scope of the invention. Its sole purpose is to present some concepts of the invention in a simplified form as a prelude to the more detailed description that is presented elsewhere.

In some embodiments, the disclosure provides a batch coating apparatus. The batch coating apparatus includes a fixing mechanism, a liquid holding mechanism, a liquid injection mechanism and a control device.

The fixing mechanism includes a plurality of fixing portions for fixing work-pieces to be coated.

The liquid holding mechanism includes a plurality of liquid tanks arranged side by side. The plurality of liquid tanks have a same shape for holding a coating liquid. The plurality of liquid tanks include a tank body portion having an accommodating space and an opening portion connected to the tank body portion. A cross-sectional area of the opening portion is greater than that of the tank body portion. The liquid holding mechanism and the fixing mechanism are relatively movable.

The liquid injection mechanism includes a liquid storage portion and an infusion portion. The liquid storage portion is configured to accommodate the coating liquid, the infusion portion is connected with the liquid storage portion, the infusion portion is configured to supply the coating liquid, and the liquid injection mechanism and the liquid holding mechanism are relatively movable.

The control device is configured to control at least one of a relative movement between the fixing mechanism and the liquid holding mechanism and a relative movement between the liquid holding mechanism and the liquid injection mechanism. The control device is configured to control the liquid injection mechanism to supply the coating liquid via the infusion portion;

When coating the work-pieces to be coated fixed to the fixing mechanism, the control device controls a relative movement between the liquid injection mechanism and the liquid holding mechanism so that the infusion portion aligns with the plurality of liquid tanks, and the control device controls the infusion portion to supply a predetermined volume of coating liquid into the plurality of liquid tanks.

The control device controls the liquid holding mechanism and the fixing mechanism to relatively move so that the work-pieces to be coated fixed to the fixing mechanism are immersed into the coating liquid in the plurality of liquid tanks and left from the coating liquid in the plurality of liquid tanks, thereby forming a coating film of a predetermined thickness on the work-pieces to be coated.

Optionally, the predetermined volume is not greater than a volume of the accommodating space and the predetermined volume is less than or equal to 100 μL.

Optionally, the opening portion includes a funnel shape tapered from an upper end to a lower end and the tank body portion is connected to the lower end of the opening portion.

Optionally, the tank body portion includes a body area and a bottom area, the body area includes a cylindrical shape, and the bottom area includes a hemispherical shape.

Optionally, the plurality of liquid tanks of the liquid holding mechanism are arranged in an array.

Optionally, the batch coating apparatus further includes a liquid injection chamber and a liquid coating chamber. In the liquid injection chamber, the liquid injection mechanism supplies the coating liquid to the liquid holding mechanism. In the liquid coating chamber, the work-pieces to be coated fixed to the fixing mechanism are immersed in the coating liquid in the plurality of liquid tanks.

Optionally, the liquid injection mechanism further includes a piston disposed in the liquid storage portion, the liquid injection mechanism moves along a lengthwise direction of the liquid storage portion, the piston is connected to an actuating part, the actuating part actuates the piston to move in the lengthwise direction of the liquid storage portion, the actuating part is connected to the control device and is controlled by the control device, and the control device controls an actuating distance and an actuating direction of the actuating part to supply a predetermined volume of the coating liquid to the plurality of liquid tanks via the infusion portion.

Optionally, the work-piece to be coated includes a first fixing area, a second fixing area, and a coating area the coating area is coated with the coating liquid substantially located on a same plane and successively connected, the first fixing area and the second fixing area are in a shape of a sheet, and the coating area is in a shape of a needle.

Optionally, the fixing portions include a first locating slot adapted to the first fixing area and a second locating slot adapted to the second fixing area, the first locating slot cooperates with the first fixing area to limit an area to be coated in a vertical direction, the second locating slot cooperates with the second fixing area to limit an area to be coated in a horizontal direction, and the coating area is limited in a predetermined position.

In other embodiments, the disclosure provides a batch coating method including the following steps. Preparing a plurality of liquid tanks having a same shape. Supplying a predetermined volume of coating liquid to each of the plurality of liquid tanks respectively. Preparing a plurality of work-pieces to be coated. Immersing each work-piece to be coated in the coating liquid in each liquid tanks. Taking each work-piece to be coated out from the coating liquid in each liquid tanks, a depth of each work-piece to be coated immersed in the coating liquid being the same, so as to form a coating film with a predetermined thickness on each work-piece to be coated. The plurality of liquid tanks includes a tank body portion having an accommodating space and an opening portion connected to the tank body portion and a cross-sectional area of the opening portion is greater than a cross-sectional area of the tank body portion.

BRIEF DESCRIPTION OF THE DRAWINGS

Illustrative embodiments of the present disclosure are described in detail below with reference to the attached drawing figures.

DETAILED DESCRIPTION

The following describes some non-limiting exemplary embodiments of the invention with reference to the accompanying drawings. The described embodiments are merely a part rather than all of the embodiments of the invention. All other embodiments obtained by a person of ordinary skill in the art based on the embodiments of the disclosure shall fall within the scope of the disclosure.

The present disclosure relates to a batch coating apparatus capable of improving uniformity, which is applied to a coating apparatus for coating a work-piece to be coated. A batch coating apparatus capable of improving consistency may be simply called as a "coating apparatus" or "apparatus", by the coating apparatus according to the present disclosure, batch coating may be performed and coating uniformity of a work-piece to be coated may be advantageously improved.

The present disclosure relates to a batch coating apparatus 1 capable of improving uniformity, the work-pieces 2 to be coated are immersed in the coating liquid and left from the coating liquid to have the work-pieces 2 to be coated. The action of the work-pieces 2 to be coated immersed in the coating liquid may be called as "dipping", and the action of the work-pieces 2 to be coated left from the coating liquid may be called as "lifting". In other words, the coating apparatus 1 may carry out coating by dip-pulling the work-pieces 2 to be coated.

Figure 1:
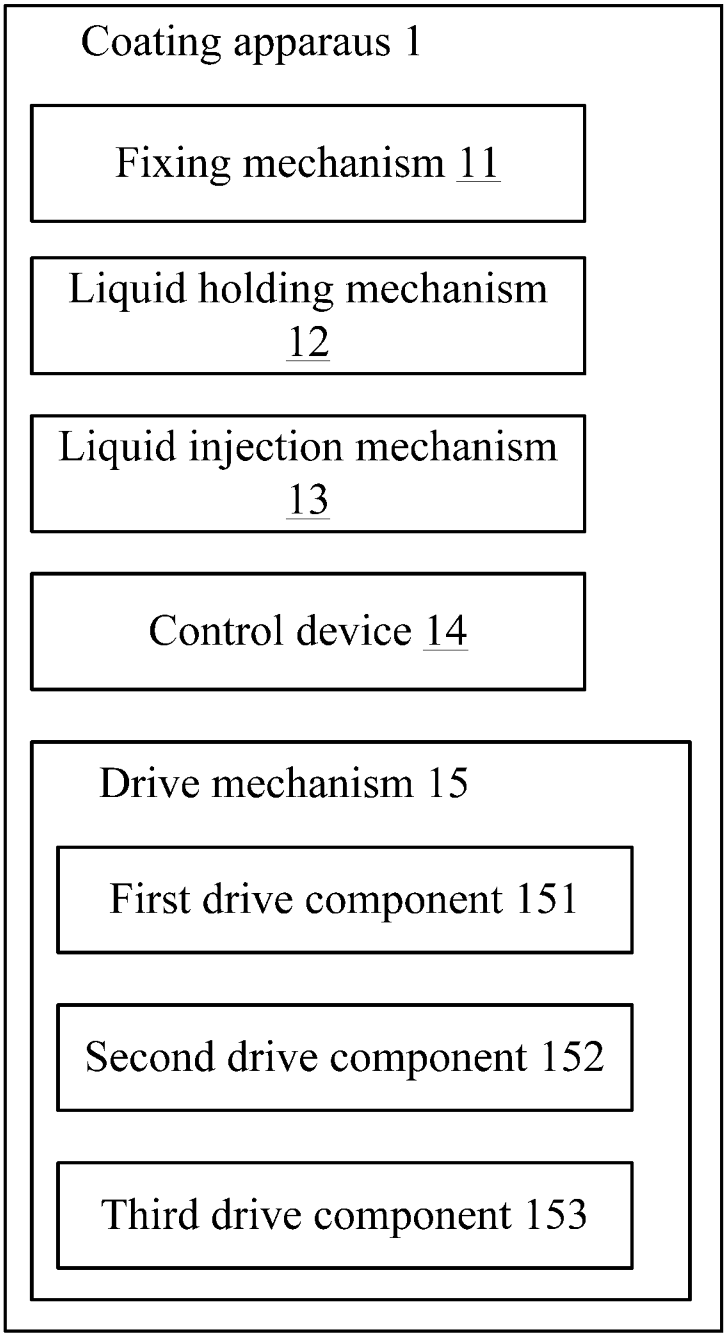
FIG. 1 is a schematic showing a coating apparatus according to an example of the present disclosure.

FIG. 1 is a schematic showing a coating apparatus 1 according to the example of the present disclosure.

Figure 2:
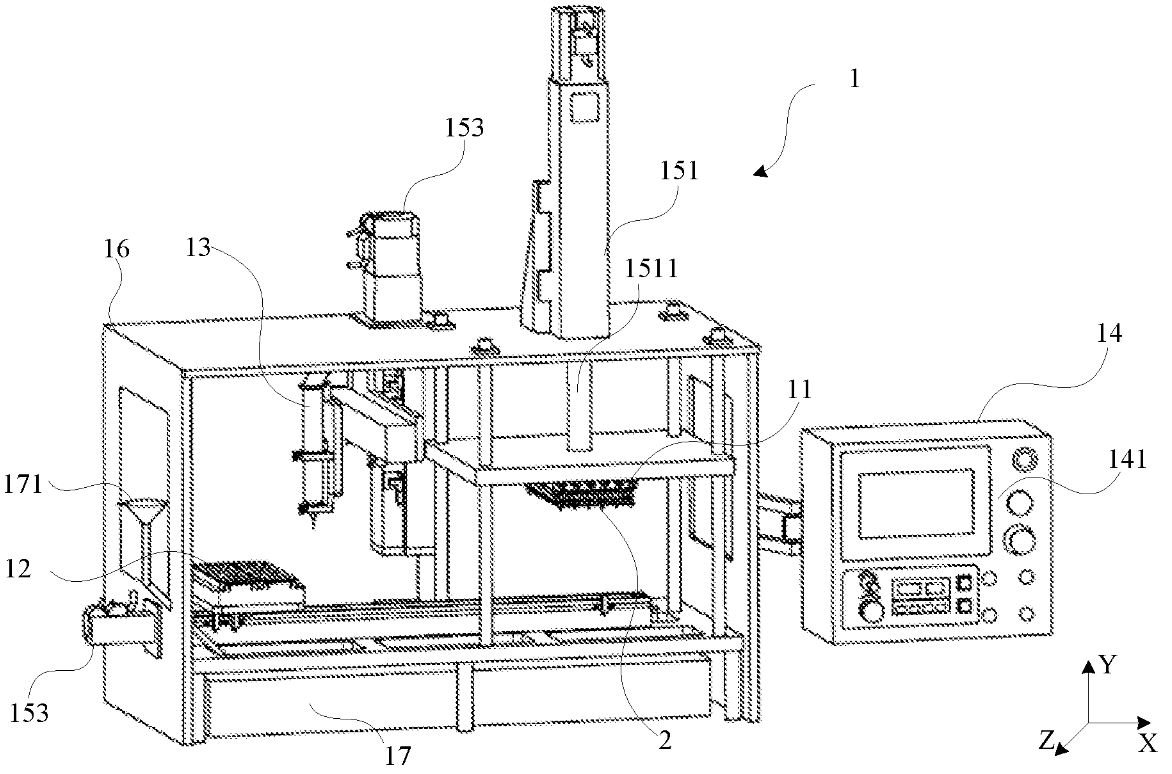
FIG. 2 is a schematic showing the overall structure of a coating apparatus according to an example of the present disclosure.

FIG. 2 is a schematic showing the overall structure of the coating apparatus 1 according to the example of the present disclosure. The coating apparatus 1 may be used for coating a plurality of work-pieces 2 to be coated.

In the present embodiment, the coating apparatus 1 may include a fixing mechanism 11, a liquid holding mechanism 12, and a liquid injection mechanism 13 (see FIG. 2). The fixing mechanism 11 may be used to fix the work-pieces 2 to be coated, the liquid holding mechanism 12 may be used to hold the coating liquid, and the liquid injection mechanism 13 may contain the coating liquid and may supply the coating liquid to the liquid holding mechanism 12.

In some examples, the coating apparatus 1 may further include a control device 14 (see FIG. 2). The control device 14 may be used to control the relative movement between the fixing mechanism 11 and the liquid holding mechanism 12, the relative movement between the liquid holding mechanism 12 and the liquid injection mechanism 13 control the liquid injection mechanism 13 to supply the coating liquid to the liquid holding mechanism 12. In this case, the work-pieces 2 to be coated may be conveniently coated by the cooperation of the fixing mechanism 11, the liquid holding mechanism 12, the liquid filling mechanism 13 and the control device 14.

In some examples, the coating apparatus 1 may further include a drive mechanism 15 (see FIG. 1). In some examples, the drive mechanism 15 may include a first drive assembly 151, a second drive assembly 152, and a third drive assembly 153 (see FIG. 1).

Figure 3:
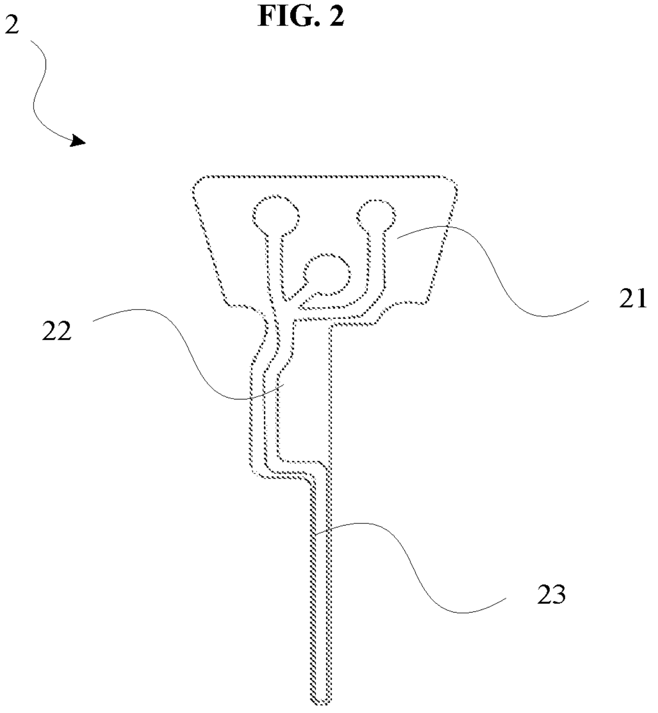
FIG. 3 is a schematic showing a structure of a work-piece to be coated according to an example of the present disclosure.

FIG. 3 is a schematic showing a structure of a work-pieces 2 to be coated according to the example of the present disclosure.

In some examples, the work-pieces 2 to be coated may have roughly coplanar and sequentially connected to a first fixing area 21, a second fixing area 22, and a coating area 23 of the coating liquid to be coated (see FIG. 3).

In some examples, the first fixing area 21 may be sheet-shaped. In some examples, the second fixing area 22 may be sheet-shaped. In some examples, the area to be coated 13 may be needle-shaped (see FIG. 3). Thus, it is possible to conveniently fix the work-pieces 2 to be coated.

In other examples, the shape of the work-pieces 2 to be coated are not particularly limited and may be selected according to practical requirements. For example, the work-pieces 2 to be coated may be sheet-shaped, column-shaped or needle-shaped.

In some examples, the connection of the second fixed area 22 to the first fixed area 21 may be a smooth connection (see FIG. 3). Thus, it is possible to conveniently fix the work-pieces 2 to be coated.

In some examples, the work-pieces 2 to be coated may be a working electrode or a micro-electrode of a glucose sensor. Hereinafter, the coating apparatus 1 according to the present embodiment will be described in detail taking the working electrode of the glucose sensor as an example.

(Fixing Mechanism 11)

Figure 4:
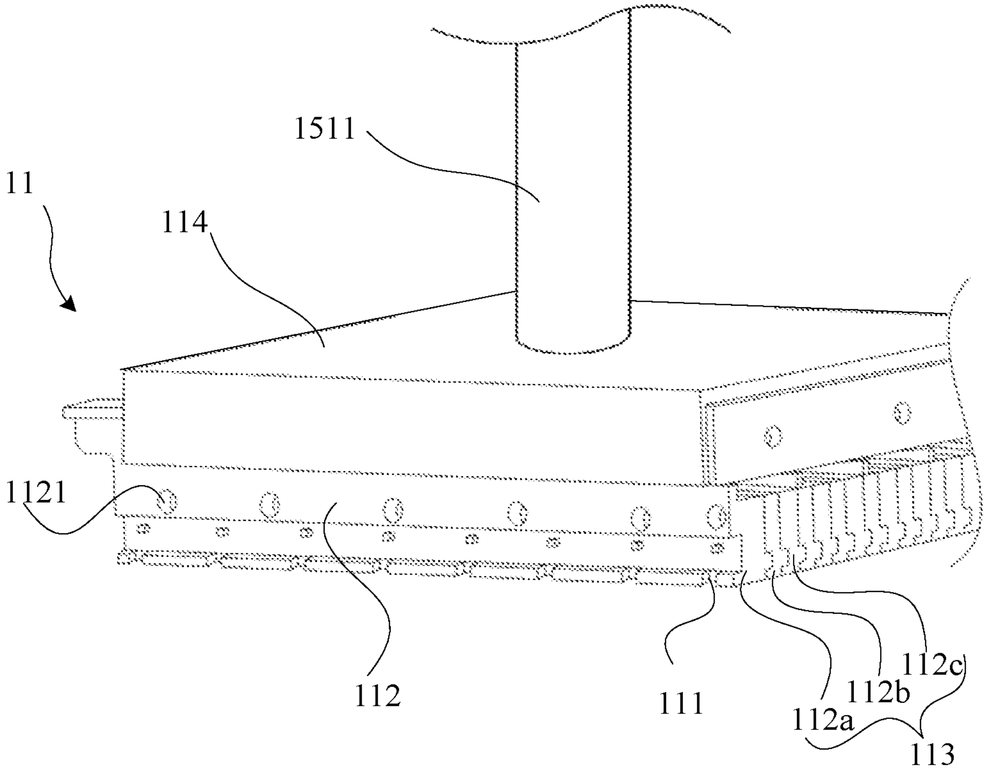
FIG. 4 is a schematic showing a structure of a fixing mechanism according to an example of the present disclosure.

FIG. 4 is a schematic showing a structure of a fixing mechanism 11 according to the example of the present disclosure.

In some examples, the fixing mechanism 11 may have a fixing portion 111 (see FIG. 4). In some examples, the number of the fixing portions 111 may be one or more. For example, the number of the fixing portions 111 may be 1, 2, 3, 4, 5, 6, 7 or 8. In some examples, the fixing portion 111 may be used to fix the work-pieces 2 to be coated. In this case, a plurality of work-pieces 2 to be coated may be fixed by the fixing mechanism 11, so that a plurality of work-pieces 2 to be coated may be coated at the same time, whereby the work-pieces 2 to be coated may be coated in batches.

In some examples, the plurality of fixing portions 111 may be arranged side by side (see FIG. 4). In some examples, the plurality of fixing portions 111 may be arranged at the same horizontal plane. In this case, by arranging a plurality of fixing portions 111 at the same horizontal plane, a plurality of work-pieces 2 to be coated may be fixed at the same horizontal plane, so that the coating uniformity may be improved. In addition, in some examples, relative positions of a plurality of fixing portions 111 are adjustable to each other. Thus, the arrangement of a plurality of fixing portions 111 may be adjusted according to actual needs. For example, a plurality of fixing portions 111 may be arranged irregularly, arranged high and low, or arranged asymmetrically. Thus, the coating apparatus 1 may be applied to more scenarios. For example, a plurality of fixing portions 111 may be arranged in high and low In this case, the coating apparatus 1 may coat a plurality of work-pieces 2 having different lengths to be coated.

In some examples, the fixing mechanism 11 may include a fixing splint 112. In some examples, the number of the fixing splint 112 may be one or more. For example, the fixing mechanism 11 may include a fixing splint 112*a*, a fixing splint 112*b*, and a fixing splint 112*c* (see FIG. 4).

In some examples, the fixing splint 112 may be substantially regular in shape, such as shape of a cuboid, cube, cylinder and the like. In some examples, such as the example shown in FIG. 4, the fixing splint 112 may be a generally flat cuboid.

In some examples, the fixing splint 112 may be provided with one or more fixing portions 111. In some examples, a plurality of fixing portions 111 may be arranged side by side on a fixing splint 112 (see FIG. 4). In this case, the fixing mechanism 11 may fix a plurality of work-pieces 2 to be coated at the same time, and a plurality of work-pieces 2 to be coated may be fixed on the fixing mechanism 11 at the same level, whereby the uniformity of coating may be improved.

In some examples, the fixing portion 111 may be welded to the fixing splint 112.

In some examples, two adjacent fixing splints 112 of a pluralities of fixing splints 112 may be connected by using magnetic attraction. For example, in some examples, the fixing splint 112 may have a connection hole 1121 (see FIG. 4). In this case, the two adjacent fixing splints 112 may be connected by magnetic attraction by placing a magnet in the connection hole 1121. In some examples, the number of the connection holes 1121 may be one or more. In some examples, a plurality of connection holes 1121 may be located on the same horizontal level.

In other examples, a plurality of fixing splints 112 may be connected by a threaded structure, and a spacing of a plurality of fixing splints 112 may be adjusted by threads.

In some examples, two adjacent fixing splints in a plurality of fixing splints 112 may have the spacing matches the size of the work-pieces 2 to be coated.

In some examples, a plurality of fixing splints 112 may be placed in parallel. In some examples, a plurality of fixing splints 112 may be arranged at the same horizontal level. For example, the fixing splint 112*a*, the fixing splint 112*b*, and the fixing splint 112*c* may be located on the same horizontal level.

In some examples, the fixing splint 112 may be one or more selected from the group consisting of aluminum alloys, iron alloys, stainless steels, nickel alloys, titanium alloys, or cemented carbides.

In some examples, a plurality of fixing splints 112 arranged side by side may form a fixing module 113. For example, the fixing splint 112*a*, the fixing splint 112*b*, and the fixing splint 112*c* may form the fixing module 113 (see FIG. 4).

In some examples, the fixing portion 111 may have a fixing clip (not shown) for fixing a work-pieces 2 to be coated.

In some examples, the fixing mechanism 11 may include a fixing base 114 (see FIG. 4). In some examples, the fixing base 114 may be roughly in regular shape, such as shape of the cuboid, the cube, the cylinder and the like. For example, the fixing base 114 may be roughly in cuboid shape (see FIG. 4).

In addition, in some examples, the fixing splint 112 arranged on the far end of the fixing portion 111 may be connected to the fixing base 114 (see FIG. 4).

In addition, in some examples, the fixing splint 112 may be connected to the fixing base 114 via a snap-fit configuration or a screw-fit configuration. In some examples, the fixing base 114 may have a plurality of grooves match with the fixing splint 112.

In some examples, the fixing base 114 may be connected to the fixing module 113. The fixing module 113 may be composed of a plurality of fixing splints 112.

In some examples, the fixing module 113 may be connected to the fixing base 114 in a rotatable way.

In some examples, the fixing mechanism 11 may be provided with a posture sensor (not shown). The posture sensor may detect the data of inclination and verticality of the horizontal position of the fixing mechanism 11. In this case, the posture of the fixing mechanism 11 may be monitored by the posture sensor, and when the posture of the fixing mechanism 11 is at a non-preset value, the posture of the fixing mechanism 11 may be adjusted to fix the plurality of work-pieces 2 to be coated at a predetermined position, whereby the errors in process parameters may be reduced to improve the uniformity the coating of the coating apparatus 1.

In some examples, the fixing mechanism 11 may fix the work-pieces 2 to be coated by the first fixing section 21 and the second fixing section 22, so that the stability of fixing a plurality of work-pieces 2 to be coated may be improved, thus the difference in process parameters among a plurality of work-pieces 2 to be coated may be reduced to improve the uniformity of the coating.

Figure 5:
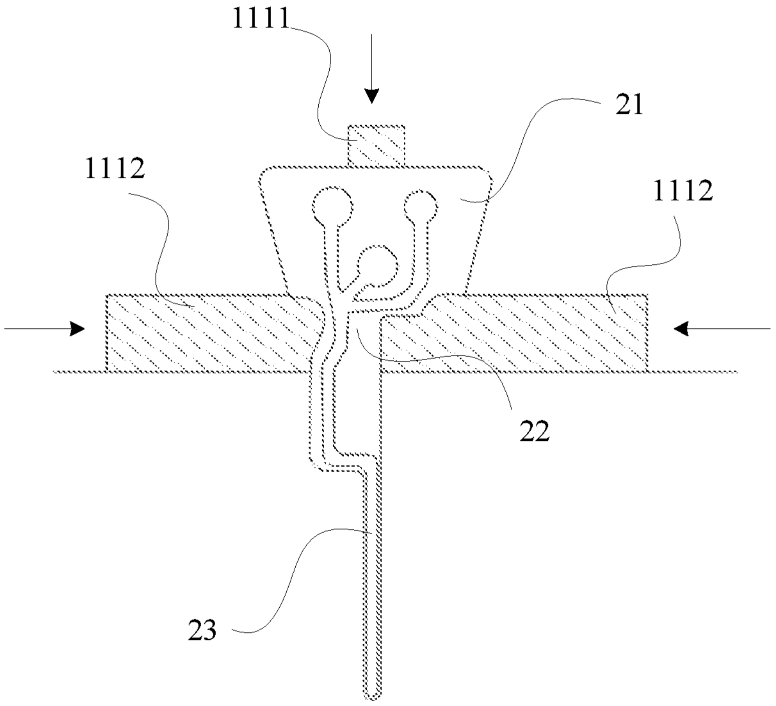
FIG. 5 is a schematic showing a fixing portion according to an example of the present disclosure.

FIG. 5 is a schematic showing a fixing portion 111 according to the example of the present disclosure.

In some examples, the fixing portion 111 may have the first locating slot 1111 match with the first fixing area 21. In some examples, the fixing portion 111 may include a second locating slot 1112 (see FIG. 5) match with the second fixing area 22.

In some examples, the first locating slot 1111 may cooperate with the first fixing area 21 to limit the area 23 to be coated in the vertical direction (see FIG. 5) to fix the work-pieces 2 to be coated in the vertical direction. In this case, the unexpected movement of the work-pieces 2 to be coated in the vertical direction may be reduced.

In some examples, a lower surface of the first locating slot 1111 may interfere with an upper surface of the first fixing area 21 to limit the area 23 to be coated in a vertical direction (see FIG. 5).

In some examples, the second locating slot 1112 may cooperate with the second fixing area 22 to limit the area 23 to be coated in the horizontal direction (see FIG. 5) to fix the work-pieces 2 to be coated in the horizontal direction. In this case, the unexpected movement of the work-pieces 2 to be coated in the horizontal direction may be reduced.

In some examples, the inner surface of the second locating slot 1112 may interfere with the side surface of the second fixing area 22 to limit the area 23 to be coated in a horizontal direction (see FIG. 5).

In some examples, the first locating slot 1111 and the second locating slot 1112 may cooperate with each other. For example, a plurality of work-pieces 2 to be coated may be fixed on the same plane by the first locating slot 1111 cooperating with the second locating slot 1112. In this case, the work-pieces 2 to be coated may be fixed in two directions by the cooperation between the first locating slot 1111 and the second locating slot 1112 so as to restrict the area 23 to be coated at a predetermined position, thereby it may advantageously improve the uniformity of coating.

(Liquid Holding Mechanism 12)

Figure 6:
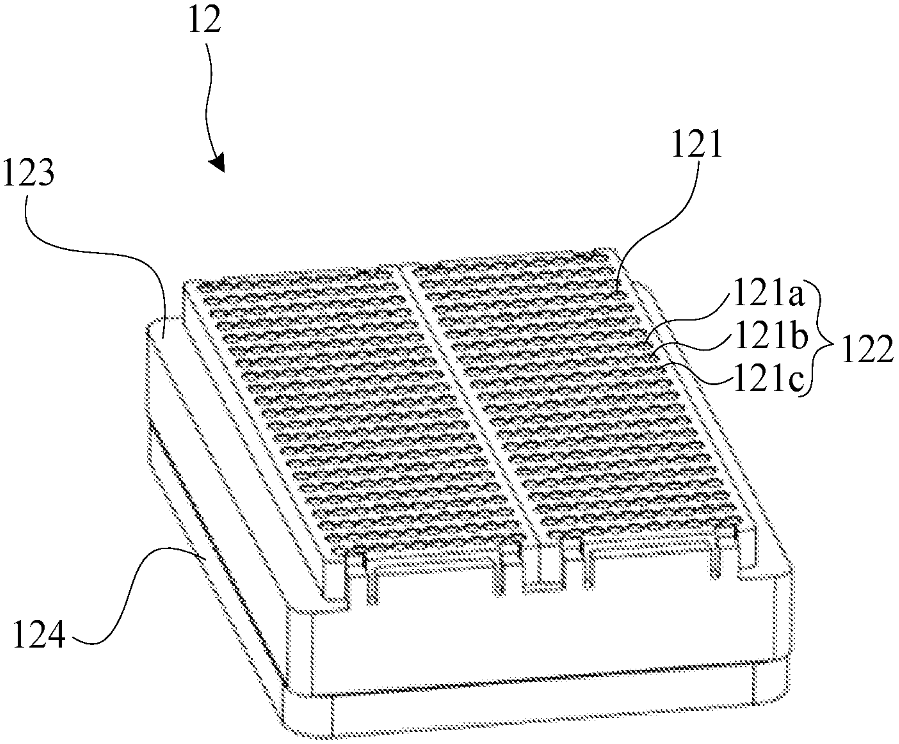
FIG. 6 is a schematic showing a liquid holding mechanism according to an example of the present disclosure.

FIG. 6 is a schematic showing a liquid holding mechanism 12 according to the example of the present disclosure.

In some examples, the liquid holding mechanism 12 may have a liquid tank 121 (see FIG. 6). In some examples, the liquid tanks 121 may be used to hold the coating liquid.

In some examples, the liquid holding mechanism 12 may have one or more liquid tanks 121. For example, in the example shown in FIG. 6, the liquid holding mechanism 12 may have the liquid tank 121*a*, the liquid tank 121*b*, and the liquid tank 121*c*. Thus, it is possible to coat the work-pieces 2 to be coated in batches.

In some examples, the shape of the plurality of the liquid tanks 121 may be the same. For example, in the embodiment shown in FIG. 6, the liquid tanks 121*a*, 121*b* and 121*c* may have the same shape. In this case, when each of the liquid tanks 121 contains the same volume of the coating liquid, the height of the liquid surface of each of the liquid tanks 121 may be kept uniform, so that the depth of the work-pieces 2 to be coated immersed in the liquid tanks may be kept uniform, whereby the uniformity of the coating may be advantageously improved.

In other examples, the shape of the plurality of the liquid tanks 121 may be different.

In some examples, the plurality of the liquid tanks 121 may be arranged in an array (see FIG. 6). In this case, the depth and the angle of the coating liquid in which the work-pieces 2 to be coated is immersed in each of the liquid tanks 121 may be kept uniform, whereby the uniformity of the coating may be advantageously improved.

In some examples, a plurality of liquid tanks 121 may be arranged at the same horizontal level (see FIG. 6). In this case, the depth and the angle of the coating liquid in which the work-pieces 2 to be coated are immersed in each of the liquid tank 121 may be kept uniform, whereby the uniformity of the coating may be advantageously improved.

In some examples, the arrangement of the liquid tanks 121 may be cooperated with the work-pieces 2 to be coated and the fixing mechanism 11. For example, in some examples, the number of the liquid tanks 121 may be the same as the number of the fixing portions 111 of the fixing mechanism 11, a plurality of the liquid tanks 121 may be arranged at the same horizontal plane, and the fixing mechanism 11 may fix the work-pieces 2 to be coated at the same horizontal plane. In this case, the angle and the depth of the coating liquid in the liquid tanks 121 in which the work-pieces 2 to be coated fixed to the fixing mechanism 11 may be made uniform so that the uniformity of the coating may be advantageously improved.

In some examples, the plurality of the liquid tanks 121 may be integrally formed. In this case, it is possible to improve the accuracy of the position between the respective liquid tank 121 to improve the coating consistency.

In some examples, the plurality of the liquid tanks 121 may be independent of each other. In this case, the respective liquid tanks 121 may be independently of each other to facilitate the adjustment of the positions of the respective liquid tanks 121.

In some examples, a plurality of tanks 121 may form a liquid tank module 122. For example, the number of the liquid tanks 121 forming the liquid tank module 122 may be 3, 5, 8, 10 or 20. In the example shown in FIG. 6, the liquid tank 121*a*, the liquid tank 121*b*, and the liquid tank 121*c* may form a liquid tank module 122.

In some examples, the liquid holding mechanism 12 may have 100 liquid tanks 121 which may form 5 liquid tank modules 122. Here, each liquid tank module 122 may integrally formed by 20 liquid tanks 121. In this case, it is possible to favorably improve the accuracy of the position between the respective liquid tank 121 and to favorably adjust the position of the liquid tanks 121, thereby it is possible to favorably improve the uniformity of the coating.

In some examples, the liquid holding mechanism 12 may have the liquid tank module 122, the liquid tank module 122 may include a plurality of liquid tanks 121. In some examples, the number of the liquid tank modules 122 may be 1, 2, 3, 4, 5, 6, or 8.

In some examples, the liquid holding mechanism 12 may have a liquid tank base 123 (see FIG. 6). In some examples, the liquid tank base 123 may be used to fix the liquid tanks 121 or the liquid tank module 122.

In some examples, the liquid tank base 123 may have a limit component 1231. The limit component 1231 may limit the liquid tanks 121 or the liquid tank module 122. For example, a plurality of the liquid tanks 121 may be located at the same level by the limit component 1231. In this case, the depth and angle of the coating liquid in which the work-pieces 2 to be coated are immersed in each of the liquid tanks 121 may be kept uniform, thus, the uniformity of the coating may be advantageously improved.

In some examples, the liquid holding mechanism 12 may be provided with a liquid holding base 124 (see FIG. 6).

In some examples, the liquid tank base 123 may be connected to the liquid holding base 124. In some examples, the liquid tank base 123 may be connected to the liquid holding base 124 in rotatable way.

In some examples, the liquid holding mechanism 12 may cooperate with the fixing mechanism 11 so that the work-pieces 2 to be coated fixed to the fixing mechanism 11 may be immersed into the coating liquid in the liquid tanks 121 and left from the coating liquid in the liquid tanks 121, thereby forming a coating film of a predetermined thickness on the work-pieces 2 to be coated. In some examples, the liquid holding mechanism 12 and the fixing mechanism 11 may be relatively moved so that the work-pieces 2 to be coated fixed on the fixing mechanism 11 may be immersed into the coating liquid in the liquid tanks 121 and left from the coating liquid in the liquid tanks 121, thereby forming a coating film of a predetermined thickness on the work-pieces 2 to be coated.

In some examples, the liquid holding mechanism 12 may not move, and the fixing mechanism 11 may move so that the work-pieces 2 to be coated fixed on the fixing mechanism 11 are aligned with the liquid tanks 121, and make the work-pieces 2 to be coated contact with the coating liquid in the liquid tanks 121 and leave from the coating liquid.

In other examples, the fixing mechanism 11 may not move, and the liquid holding mechanism 12 may move so that the liquid tanks 121 are aligned with the work-pieces 2 to be coated fixed on the fixing mechanism 11, and make the work-pieces 2 to be coated contact with the coating liquid in the liquid tanks 121 and leave from the coating liquid.

In some examples, the fixing mechanism 11 and the liquid holding mechanism 12 may relatively move so that the work-pieces 2 to be coated fixed to the fixing mechanism 11 are aligned with the liquid tanks 121, and make the work-pieces 2 to be coated contact with the coating liquid in the liquid tanks 121 and leave from the coating liquid. For example, in the embodiment shown in FIG. 2, the liquid holding mechanism 12 may horizontally move to the right to below the work-pieces 2 to be coated fixed to the fixing mechanism 11, the fixing mechanism 11 is moved up and down in the vertical direction so that the work-pieces 2 to be coated fixed to the fixing mechanism 11 are immersed in the coating liquid of the liquid holding mechanism 12 and left from the coating liquid.

Figure 7:
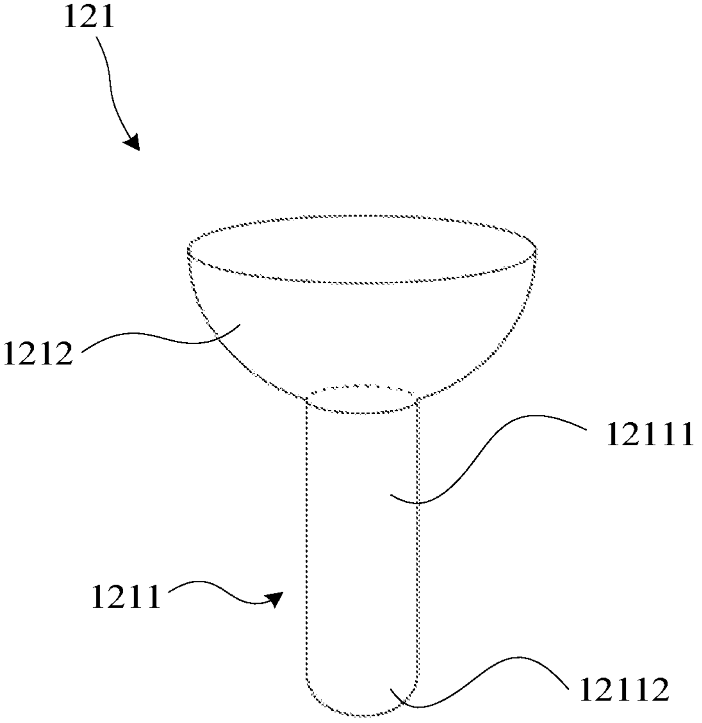
FIG. 7 is a schematic showing the liquid tanks shown in FIG. 6.

FIG. 7 is a schematic showing the liquid tanks 121 shown in FIG. 6.

In some examples, the liquid tank 121 may include a liquid tank body 1211 (see FIG. 7). In some examples, the tank body portion 1211 may have the accommodating space.

In some examples, the liquid tanks 121 may also include an opening portion 1212 (see FIG. 7). In some examples, the opening portion 1212 may have an accommodating space. In some examples, the opening portion 1212 may be connected to the tank body portion 1211.

In some examples, such as the example shown in FIG. 7, the opening portion 1212 may have a funnel shape gradually tapering from an upper end to a lower end. Thus, it is possible to improve the utilization rate of the coating liquid.

In some examples, the side wall of the upper end of the opening portion 1212 may extend in a vertical direction. For example, in some examples, the upper end of the opening portion 1212 may be cylindrical. In some examples, when the work-pieces 2 to be coated leaves from the coating liquid, some of the coating liquid may be accumulated to the lowest end of the area 23 to be coated in a water droplet form, thereby affecting the thickness of the film layer at the lowest end of the area 23 to be coated. In this case, by arranging the side wall of the upper end of the opening portion 1212 to extend in the vertical direction, It is possible to facilitate the separation of the coating liquid adhering to the work-pieces 2 to be coated from the opening portion 1212, so that the volume of the coating liquid deposited on the lowest end of the area 23 to be coated may be reduced, thus it is possible to facilitate the formation of a uniform coating film on the surface of the work-pieces 2 to be coated.

In some examples, the side wall at the upper end of the opening portion 1212 may be inclined outward from the vertical direction by 0° to 90°. For example, in some examples, the sides of the opening 1212 may be inclined outwardly from the vertical direction by 0°, 10°, 20°, 30°, 40°, 50°, 60°, 75° or 90°. In other examples, the sidewall at the upper end of the opening portion 1212 may be inclined inward from the vertical direction by 0° to 180°. For example, in some examples, the sidewalls at the upper end of the opening portion 1212 may be inclined inward from the vertical direction and roughly be needle-shaped. In this case, it is possible to facilitate the separation of the coating liquid deposited on the work-pieces 2 to be coated from the opening portion 1212 during the process of the work-pieces 2 to be coated leaving from the coating liquid, and thus it is possible to facilitate the formation of a uniform coating film on the surface of the work-pieces 2 to be coated.

In some examples, the lower end of the opening portion 1212 may be connected to the tank body portion 1211 in a gradually tapered funnel shape. In some examples, the opening portion 1212 may smoothly connect with the tank portion 1211.

In some examples, the cross sectional area of the opening portion 1212 may be greater than the cross sectional area of the tank body portion 1211. When the work-pieces 2 to be coated are leaving from the coating liquid, the volume of the coating liquid adhering to the surface of the work-pieces 2 to be coated are related to the surface tension of the coating liquid, and the volume of the coating liquid adhering to the surface of the work-pieces 2 to be coated affects the thickness of the coating film formed on the surface of the work-pieces 2 to be coated, and the surface tension is related to the length of the dividing line. In this case, by setting the cross-sectional area of the opening portion 1212 to be greater than the cross-sectional area of the liquid tank portion 1211, It may be beneficial to improve the utilization rate of the coating liquid when a coating film of a predetermined thickness is formed on the surface of the work-piece 2 to be coated.

In some examples, the liquid tanks 121 may be made from an antistatic material. For example, the liquid tanks 121 may be made from one or more from the group consisting of a PVC material, a PET material, or a PP material. When the liquid is located in the container, due to the electrostatic adsorption of the inner wall of the container to the liquid, when the adsorption force of the inner wall of the container to the liquid is greater than the intermolecular force in the liquid, the liquid surface located inside the container form a downward concave shape. In this case, by using the liquid tank 121 made from the antistatic material, the electrostatic adsorption effect of the liquid tank wall in the liquid tank 121 to the coating liquid may be reduced, so that the liquid surface of the coating liquid form a substantially horizontal shape, so that the depths of the plurality of work-pieces 2 to be coated immersed in the coating liquid are uniform, which may facilitate improving the uniformity of the coating.

In some examples, the tank body portion 1211 may include a body area 12111 and a bottom area 12112 (see FIG. 7). In some examples, the body area 12111 may be connected to the opening portion 1212.

In some examples, the body area 12111 may be cylindrical (see FIG. 7). In some examples, the bottom area 12112 may be hemispherical (see FIG. 7). When the air bubbles exist in the coating liquid, some of the air bubbles immersed in the coating liquid may adhere to the surface of the work-pieces 2 to be coated, affecting the uniformity of the coating film on the surface of the work-pieces 2 to be coated. In this case, by providing the bottom area 12112 as a hemisphere shape, the bottom area 12112 may be smoothly connected to the body area 12111, so that it may be advantageous to reduce the air bubbles generated during the process of supplying the coating liquid into a liquid tank 121, thereby it may be advantageous to form a uniform coating film on the surface of the work-pieces 2 to be coated.

In some examples, the length of the body area 12111 may match the area to be coated 23. For example, the length of the body area 12111 may be equal to or greater than the area to be coated 23. In this case, when the work-pieces 2 to be coated are immersed in a coating liquid in a liquid tank 121, an area 23 to be coated may be completely immersed in the coating liquid and the utilization rate of the coating liquid may be improved.

In some examples, the liquid tanks 121 may contain a predetermined volume of coating liquid.

In some examples, the predetermined volume of the coating liquid may be less than or equal to the volume of the accommodating space of the tank body portion 1211. In other examples, the predetermined volume of the coating liquid may be less than or equal to the sum of the volume of the accommodating space of the liquid tank portion 1211 and the volume of the accommodating space of the opening portion 1212.

In some examples, the predetermined volume of the coating liquid may be less than or equal to 100 μL. For example, the predetermined volume of the coating liquid may be 1 μL, 3 μL, 5 μL, 10 μL, 15 μL, 20 μL, 25 μL, 40 μL, 50 μL, 60 μL, 70 μL, 80 μL, 90 μL, or 100 μL.

In some examples, the volume of the accommodating space of the tank body portion 1211 may be less than or equal to 100 μL. For example, the volume of the accommodating space of the tank body portion 1211 may be 1 μL, 3 μL, 5 μL, 10 μL, 15 μL, 20 μL, 25 μL, 40 μL, 50 μL, 60 μL, 70 μL, 80 μL, 90 μL, or 100 μL.

In some examples, the volume of the accommodating space of the opening portion 1212 may be less than or equal to 100 μL.

Figure 8A:
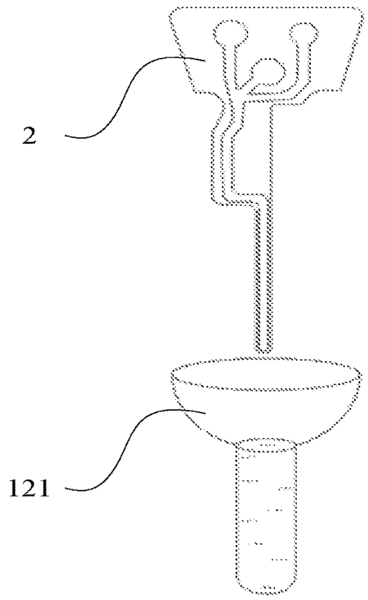
FIG. 8A is a schematic showing a work-piece to be coated before being immersed in a coating liquid in a liquid tank according to an example of the present disclosure.
Figure 8B:
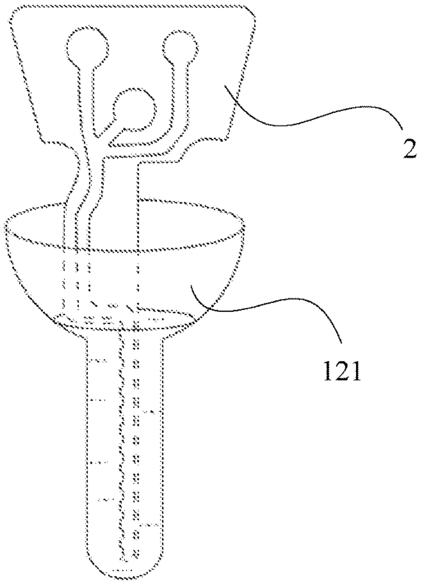
FIG. 8B is a schematic showing a work-piece to be coated after being immersed in a coating liquid in a liquid tank according to an example of the present disclosure.

FIG. 8A is the schematic showing the work-pieces 2 to be coated before being immersed in the coating liquid in the liquid tank 121 according to the example of the present disclosure. FIG. 8B is a schematic showing the work-pieces 2 to be coated after being immersed in the coating liquid in the liquid tank 121 according to the example of the present disclosure.

In some examples, before immersing the work-pieces 2 to be coated in the coating liquid in the liquid body portion 1211, the coating liquid may keep the same level with the conjunction area between the tank body portion 1211 and the opening portion 1212 (see FIG. 8A). In other examples, the liquid surface of the coating liquid may be located at the opening portion 1212 before the work-pieces 2 to be coated are immersed in the coating liquid in the liquid tank 121.

In some examples, when the work-pieces 2 to be coated are immersed in the coating liquid of the liquid tank 121, the liquid level of the coating liquid may rise, for example, rise to the opening portion 1212 (see FIG. 8B).

In other examples, when the work-pieces 2 to be coated are immersed in the coating liquid of the liquid tank 121, the liquid level of the coating liquid may rise to be level with the uppermost end of the opening portion 1212.

In some examples, after the work-piece 2 to be coated leaves the liquid tank 121, the liquid level of the coating liquid may be lowered from the opening portion 1212 to the tank body portion 1211.

In some examples, after the work-pieces 2 to be coated exits from the liquid tank 121, the work-pieces 2 to be coated may be covered with a coating liquid, and a coating film may be formed on the work-pieces 2 to be coated after the coating liquid covered on the work-piece 2 to be coated is dried.

(Liquid Injection Mechanism 13)

Figure 9:
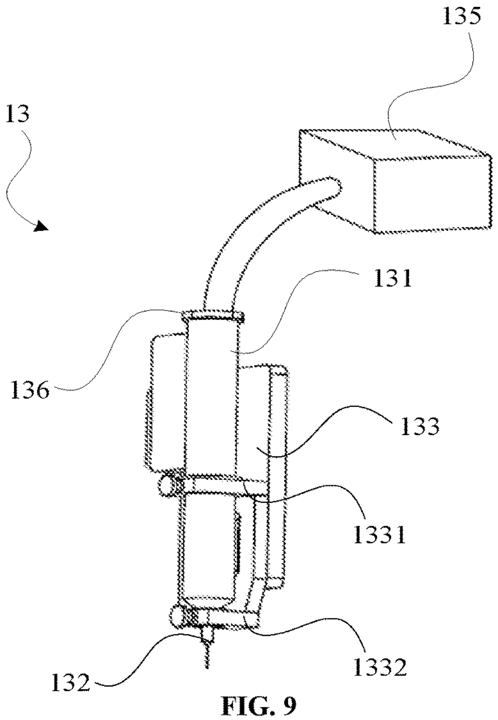
FIG. 9 is a schematic showing a liquid injection mechanism according to an example of the present disclosure.

FIG. 9 is a schematic showing a liquid injection mechanism 13 according to the example of the present disclosure.

Figure 10:
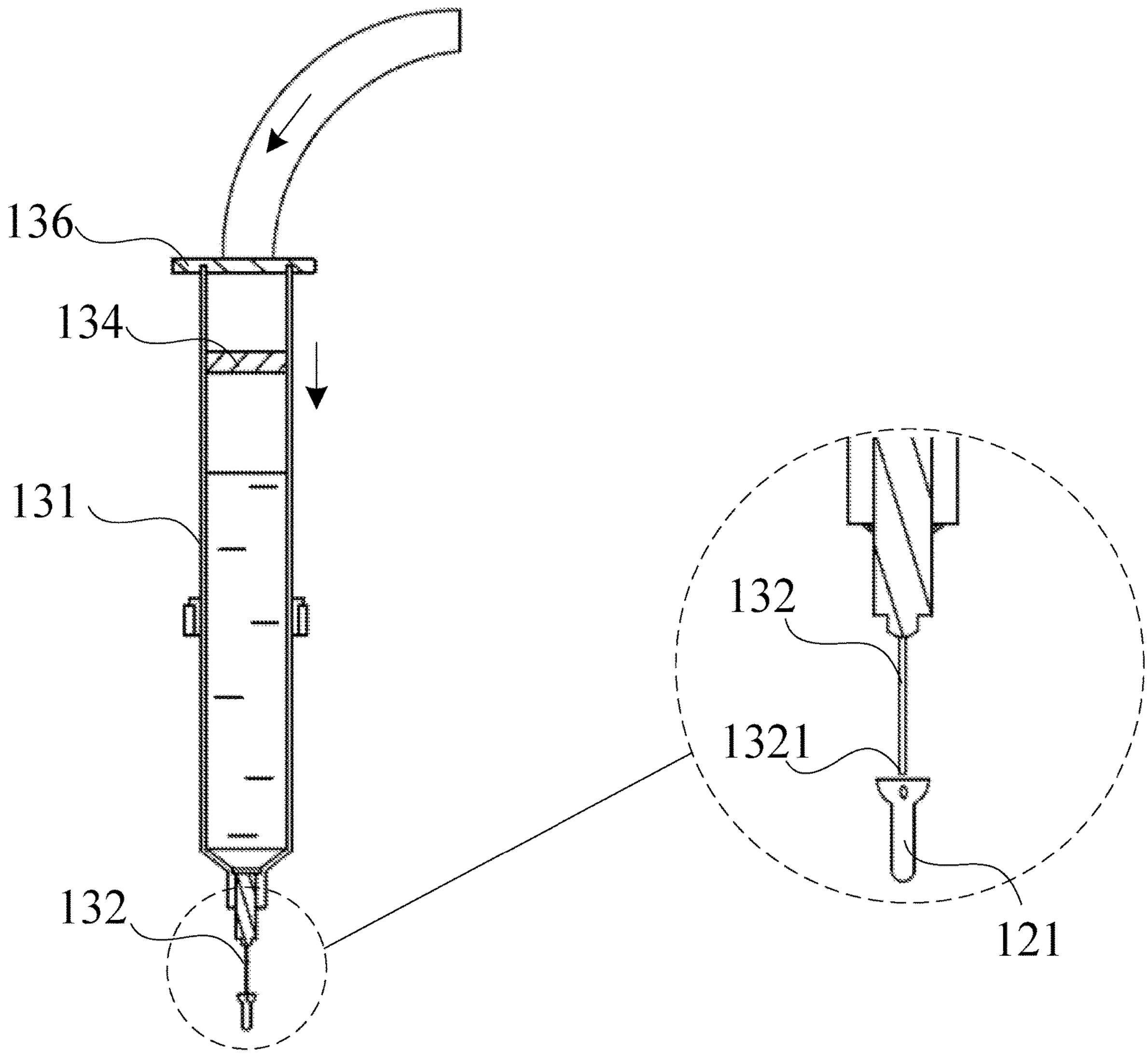
FIG. 10 is a schematic showing that a liquid filling mechanism supplies coating liquid to liquid tanks according to an example of the present disclosure.

FIG. 10 is a schematic shows the liquid injection mechanism 13 supplies the coating liquid to the liquid tank 121 according to the example of the present disclosure.

In some examples, the liquid injection mechanism 13 may have a reservoir 131 (see FIG. 9). The reservoir 131 may be used to contain a coating liquid.

In some examples, the reservoir 131 may be provided with an inlet tube (not shown). In some examples, the coating liquid may be supplied into the reservoir 131 through a liquid inlet pipe.

In some examples, the reservoir 131 may be generally cylindrical (see FIG. 9).

In some examples, the reservoir 131 may be provided with a stirring portion (not shown). In this case, the coating liquid located in the reservoir 131 may be stirred by the stirring portion to obtain a uniform coating liquid, whereby the uniformity of the coating may be advantageously improved.

In some examples, the liquid injection mechanism 13 may have an infusion portion 132 (see FIG. 9). The infusion portion 132 may be used to supply the coating liquid.

In some examples, the infusion portion 132 may be generally needle-shaped (see FIG. 9).

In some examples, the infusion portion 132 may be connected with the reservoir portion 131. Thus, the coating liquid at the reservoir portion 131 may be supplied to the outside via the infusion portion 132.

In some examples, the infusion portion 132 and the reservoir portion 131 may connect through tubing (not shown). In some examples, the infusion portion 132 and the reservoir 131 may be integrally formed. In this case, it may improve the accuracy of the position between the infusion portion 132 and the reservoir 131, thereby it is beneficial to improve the uniformity of the uniformity of the coating In some examples, the cross-sectional area of the infusion portion 132 may be smaller than the cross-sectional area of the reservoir 131.

In some examples, the infusion portion 132 may have an infusion port 1321 (see FIG. 10).

In some examples, the infusion port 1321 may be curved or inverted triangular (not shown). In this case, if the viscosity of the coating liquid is high, the accumulation of the coating liquid at the infusion port 1321 may be reduced by setting the infusion port 1321 in an arc shape or an inverted triangle shape, whereby it is beneficial to precisely control the volume of the coating liquid output through the infusion portion 132.

In some examples, the infusion portion 132 may be provided with a flow sensor (not shown). In this case, the flow sensor may detect the flow velocity and the flow rate of the coating liquid flow through the infusion portion 132, so that the volume of the coating liquid output flow through the infusion portion 132 may be precisely controlled, whereby the uniformity of the coating may be improved.

In some examples, the infusion portion 132 may be provided with an on-off valve (not shown). In this case, the on-off valve may be opened when the coating liquid is supplied through the infusion portion 132, and the valve may be closed when the supply of the coating liquid is stopped, so that it is beneficial to precisely control the volume of the coating liquid output through the infusion portion 132, whereby it is beneficial to reduce the waste of the coating liquid and improve the uniformity of the coating.

In some examples, the liquid injection mechanism 13 may have a bracket 133 (see FIG. 9). The bracket 133 may be used to fix the reservoir 131 and the infusion portion 132.

In some examples, the bracket 133 may have a first fixing clip 1331 (see FIG. 9). The first fixing clip 1331 may be used to fix the reservoir 131. In this case, the reservoir 131 may be fixed at a predetermined position by the first fixing clip 1331. In some examples, the outside of the reservoir 131 may have a slot (not shown) adapt to the first fixing clip 1331.

In some examples, the bracket 133 may have a second fixing clip 1332 (see FIG. 9). The second fixing clip 1332 may be used to fix the infusion portion 132. In this case, the infusion portion 132 may be fixed at a predetermined position by the second fixing clip 1332.

In some examples, the liquid injection mechanism 13 may include a piston 134 (see FIG. 10). In some examples, the piston 134 may be disposed within the reservoir 131 and may move along the length direction of the reservoir 131.

In some examples, the coating liquid may be disposed in the space of the reservoir 131 between the piston 134 and the infusion portion 132. In some examples, the piston 134 may not be in contact with the coating liquid. In this case, when the piston 134 moves in the direction of the infusion portion 132 within the reservoir 131, the coating liquid located within the reservoir 131 may move in the direction of the infusion portion 132.

In some examples, the piston 134 may have positioning teeth (not shown). positioning teeth may be used to locate the position of the movement. of the piston 134. In this case, the distance moved by the piston 134 may be calculated by positioning the position of the piston 134 by the positioning teeth, so that the volume that the piston 134 pushes the coating liquid through the infusion portion 132 may be calculated, which facilitates accurate control of the volume of the coating liquid to be output through the infusion portion 132, thereby facilitating the improvement in the uniformity of the coating.

In some examples, the liquid injection mechanism 13 may include an actuating part 135 (see FIG. 9). In some examples, piston 134 may be connected to actuating part 135. The actuating part 135 may actuate the piston 134 to move along the length direction of the reservoir 131.

In some examples, the liquid injection mechanism 13 may supply a predetermined volume of coating liquid to the liquid holding mechanism 12.

In some examples, the actuating part 135 may be pneumatically actuated. In some examples, the reservoir 131 may be connected to the actuating part 135 through a pneumatic pipe (see FIG. 9). In some examples, the actuating part 135 may supply gas into the reservoir 131 through a pneumatic pipe. In this case, the actuating part 135 may actuate the piston 134 to move along the length direction of the reservoir portion 131 by pneumatic pushing, whereby the coating liquid located in the reservoir 131 may be supplied outward via the infusion portion 132.

In some examples, the liquid injection mechanism 13 may include a sealing cap 136 (see FIG. 9). In some examples, a sealing cap 136 may be provided at the connection between the reservoir 131 and the pneumatic pipe.

In some examples, the gas supplied by the actuating part 135 into the reservoir 131 may be an inert gas. For example, in some examples, the gas supplied by the actuating part 135 into the reservoir 131 may be nitrogen.

In some examples, the actuating part 135 may suck the gas in the reservoir 131.

In some examples, the actuating part 135 may be mechanically actuated. In some examples, the piston 134 may be connected to the actuating part 135 by a connecting rod (not shown). In this case, the actuating part 135 may actuate the piston 134 to move along the length direction of the reservoir 131 by actuating the connecting rod, whereby the coating liquid located in the reservoir 131 may be supplied outward via the infusion portion 132.

In some examples, the actuation distance and actuation direction of the actuation member 135 may be adjustable. In this case, by adjusting the actuation distance and the actuation direction of the actuation member 135, it is possible to control the volume of the coating liquid output via the infusion portion 132.

In some examples, the liquid injection mechanism 13 and the liquid holding mechanism 12 may cooperate to align the infusion portion 132 with the liquid tanks 121 and supply a predetermined volume of coating fluid to the liquid tanks 121 through the infusion portion 132 by the liquid injection mechanism 13. In some examples, the liquid injection mechanism 13 and the liquid holding mechanism 12 may be relatively move so that the infusion portion 132 is aligned with the liquid tanks 121 and a predetermined volume of coating liquid is supplied to the liquid tanks 121 via the infusion portion 132 by the liquid injection mechanism 13.

In some examples, the liquid holding mechanism 12 may not move, the liquid injection mechanism 13 moves to align the infusion portion 132 with the liquid tanks 121 and supply a predetermined volume of coating liquid to the liquid tanks 121 via the infusion portion 132. In other examples, the liquid injection mechanism 13 may not move, the liquid holding mechanism 12 moves to align the infusion portion 132 with the liquid tanks 121 and a predetermined volume of coating fluid is supplied to the liquid tanks 121 via the infusion portion 132 by the liquid injection mechanism 13.

The present embodiment is not limited to this, and the liquid filling mechanism 13 and the liquid holding mechanism 12 may move relative to each other. For example, in the embodiment shown in FIG. 2, the liquid holding mechanism 12 may move to the right below the liquid injection mechanism 13, and the liquid injection mechanism 13 may move vertically downward to align the infusion portion 132 with the liquid tanks 121 and supply a predetermined volume of coating liquid to the liquid tanks 121 via the infusion portion 132.

In some examples, in the example shown in FIG. 10, the infusion port 1321 may be higher than the opening portion 1211 when the coating liquid is supplied to the liquid tanks 121 by the liquid injection mechanism 11. In other examples, when the coating liquid is supplied to the liquid tanks 121 by the liquid injection mechanism 11, the infusion port 1321 may be level with the connection between the opening portion 1211 and the tank body portion 1212. or lower than the connection between the opening portion 1211 and the tank body portion 1212.

In some examples, when the coating liquid is supplied to the liquid tanks 121 by the liquid injection mechanism 11, the infusion port 1321 may not be in contact with the liquid tanks 121 (see FIG. 10). In other examples, when the film coating liquid is supplied to the liquid tanks 121 by the liquid injection mechanism 11, the infusion port 1321 may contact the inner wall of the liquid tanks 121 and leave the liquid tanks 121 after a predetermined volume of the coating liquid is supplied.

In some examples, the infusion port 1321 may be aligned at the center of the liquid tanks 121 when the coating liquid is supplied to the liquid tanks 121 by the liquid injection mechanism 11 (see FIG. 10).

In some examples, when the coating liquid is supplied to the liquid tanks 121 by the liquid injection mechanism 11, the coating liquid may contact the bottom area 12112 of the liquid tanks 121 and gradually rise from the bottom area 12112.

(Control Device 14)

In some examples, the control device 14 may have a processing module (not shown) for analyzing and processing data information. In some examples, the processing module may receive and output data information. For example, the processing module may generate a movement route based on a current position and a target position of the controlled component, and generate a control instruction, and send the control instruction to control the controlled component to carry out an action.

In some examples, the control device 14 may have a console 141 (see FIG. 2). The console 141 may be used to monitor data and input control instructions.

In some examples, the console 141 may have a plurality of function keys. For example, the console 141 may have function keys such as a power key, a start key, a stop key, a reset key, an emergency stop key, and the like.

In some examples, the console 141 may be provided with an alarm (not shown). In this case, when it is detected that a certain parameter of the coating apparatus 1 is not at a preset safety value, warning may be performed by means of an alarm.

In addition, in some examples, the console 141 may have a display screen. For example, the display screen may display information on an ongoing step of the coating apparatus 1, an operating temperature, and the like.

In some examples, the control device 14 may be controlled by a programmed program. In some examples, the control device 14 may have a terminal interface (not shown), the terminal interface may connect to external terminal apparatus. In some examples, the external terminal device may input a preset program to the control device 14.

In some examples, the control device 14 may be provided with a temperature sensor (not shown).

In some examples, the control device 14 may be provided with a humidity sensor (not shown).

In some examples, the control device 14 may be configured to control the movement of the fixing mechanism 11. For example, in the example shown in FIG. 2, the control device 14 may control the fixing mechanism 11 to move up and down in the vertical direction.

In some examples, the control device 14 may be configured to control the movement of liquid holding mechanism 12. For example, in the example shown in FIG. 2, the control device 14 may control the liquid holding mechanism 12 to move left and right in the horizontal direction.

In some examples, the control device 14 may be configured to control the relative movement between the fixing mechanism 11 and the liquid holding mechanism 12. For example, in the example shown in FIG. 2, the control device 14 may control the liquid holding mechanism 12 to move to the right in the horizontal direction so that the liquid tanks 121 are aligned with the work-pieces 2 to be coated fixed on the fixing mechanism 11, and control the fixing mechanism 11 to move up and down in the vertical direction so that the work-pieces 2 to be coated fixed on the fixing mechanism 11 are immersed in the coating liquid in the liquid tanks 121 and leave from the coating liquid.

In some examples, the control device 14 may control the parameters of residence time, drying time, number of cycles, etc. of the work-pieces 2 to be coated.

In some examples, the control device 14 may be configured to control the movement of the liquid injection mechanism 13. For example, in the example shown in FIG. 2, the control device 14 may control the liquid injection mechanism 13 to move to the lower left to align the infusion portion 132 with the liquid tank 121.

In some examples, the control device 14 may be configured to control the relative movement between the liquid holding mechanism 12 and the liquid injection mechanism 13. For example, in the example shown in FIG. 2, the control device 14 may control the liquid holding mechanism 12 to move to the right in the horizontal direction so that the liquid tanks 121 are aligned with the infusion portion 132, and control the filling mechanism 13 to move downward to supply the coating liquid to the liquid tanks 121 via the infusion portion 132.

In some examples, the control device 14 may be configured to control the liquid injection mechanism 13 to supply the coating liquid via the infusion portion 132.

In some examples, the control device 14 may control the actuating part 135. In this case, the control device 14 may control the liquid injection mechanism 13 to supply the predetermined volume of the coating liquid to the liquid holding mechanism 12 by controlling the actuating distance and the actuating direction of the actuating part 135 based on the predetermined volume of the coating liquid. For example, in some examples, when the actuating part 135 is pneumatically driven, the control device 14 may control the pneumatic pressure and the pneumatic output rate output by the actuating part 135 to the reservoir 131 to control the volume of coating liquid output, thereby supplying a predetermined volume of coating liquid to the reservoir 121 via the infusion portion 132.

(Drive Mechanism 15)

In some examples, the drive mechanism 15 may include a first drive assembly 151 (see FIG. 1). In some examples, the first drive assembly 151 may have a first drive motor (not shown).

In some examples, the first drive assembly 151 may be used to drive the movement of fixing mechanism 11.

In some examples, the first drive assembly 151 may be provided with a first drive column 1511. In some examples, the first drive assembly 151 may be connected to the fixing mechanism 11 via the first drive column 1511 (see FIG. 2 and FIG. 4). In this case, the first drive assembly 151 may drive the fixing mechanism 11 to move by driving the first drive column 1511.

In some examples, the first drive assembly 151 may be provided with a guide portion. In some examples, the guide portion may be a long rod.

In some examples, the guide portion may extend along the direction of the relative movement of the fixing mechanism 11 and the liquid holding mechanism 12 and may guide the fixing mechanism 11 during the movement. In some examples, the fixing mechanism 11 may be connected to the guide portion. In this case, The guide portion may advantageously improve the stability of the fixing mechanism 11 when moving, so that it may be advantageous to improve the stability of the process in which the work-pieces 2 to be coated are immersed in the coating liquid, and thus it may be advantageous to form a uniform coating film on the surface of the work-pieces 2 to be coated.

In some examples, the drive mechanism 15 may include a second drive assembly 152 (see FIG. 1). In some examples, the second drive assembly 152 may have a second drive motor (not shown).

In some examples, the second drive assembly 152 may be used to drive movement of the liquid holding mechanism 12. In some examples, the second drive assembly 152 may be connected to the liquid holding mechanism 12.

In some examples, the second drive assembly 152 may be provided with a guide rail. The guide rail may extend along the direction of the relative movement of the liquid holding mechanism 12 and the fixing means 11 and may guide the liquid holding mechanism 12 during the movement. In this case, The guide rail may advantageously improve the stability of the liquid holding mechanism 12 when moving, so that the volume of the coating liquid in the liquid tanks 121 before and after the movement of the liquid holding mechanism 12 is kept at the same, and it is possible to improve the uniformity of the coating.

In some examples, the drive mechanism 15 may include a third drive assembly 153 (see FIG. 1). In some examples, the third drive assembly 153 may be used to drive the movement of the liquid injection mechanism 13.

In some examples, the third drive assembly 153 has a third drive motor (not shown).

In some examples, In some examples, the third drive assembly 153 may have an X-axis drive portion, a Y-axis drive portion, and a Z-axis drive portion (not shown). In this case, the third drive assembly 153 may drive the liquid injection mechanism 13 to move in the three-dimensional direction by the X-axis drive portion, the Y-axis drive portion, and the Z-axis drive portion.

In some examples, the X-axis drive portion, the Y-axis drive portion, and the Z-axis drive portion may operate independently. In some examples, the X-axis drive portion, the Y-axis drive portion 1531, and the Z-axis drive portion may cooperate with each other without interfering with each other during operation.

In some examples, the third drive assembly 153 may be connected to the bracket 133. In this case, the third drive assembly 153 may drive the liquid injection mechanism 13 to move by the drive bracket 133.

In some examples, the drive mechanism 15 may be controlled by the control device 14. For example, the driving direction and the driving speed of the drive mechanism 15 may be controlled by the control device 14.

In some examples, the coating apparatus 1 may be provided with a tank body 16 (see FIG. 2). In some examples, the tank body 16 may be provided with an observation window made from a transparent material. In this case, it is possible to observe the coating apparatus 1 working status through the observation window.

In some examples, the fixing mechanism 11, the liquid holding mechanism 12, and the liquid injection mechanism 13 may be disposed inside the tank body 16 (see FIG. 2).

In some examples, the tank body 16 may be an enclosed space during the coating operation.

In some examples, the coating apparatus 1 may include a liquid injection chamber (not shown). In some examples, the liquid injection mechanism 13 may be disposed within the liquid injection chamber. In some examples, in the liquid injection chamber, the liquid injection mechanism 13 may supply the coating liquid to the liquid holding mechanism 12.

In some examples, the coating apparatus 1 may include a coating chamber (not shown). In some examples, in the coating chamber, the work-pieces 2 to be coated fixed to the fixing mechanism 11 may be immersed in the liquid tank 121.

In some examples, the liquid injection chamber and the coating chamber may be connected. In this case, the liquid holding mechanism 12 may hold the coating liquid in the liquid injection chamber and then move to the coating chamber to cooperate with the fixing mechanism 11 to coat the work-pieces 2 to be coated.

In some examples, the film coating apparatus 1 may include a volatilization tank 17 (see FIG. 2). The volatilization tank 17 may be used to hold a volatile liquid. In some examples, the volatilization tank 17 may be disposed at the bottom of the tank body 16 (see FIG. 2).

In some examples, the volatilization tank 17 may be provided with an introduction device 171 (see FIG. 2). The may be used to introduce the volatile liquid into the volatilization tank 17.

In some examples, the volatile liquid may be an anhydrous ethanol. Particularly, after the work-pieces 2 to be coated left from the coating liquid, the coating liquid on the work-pieces 2 to be coated takes a period of time to dry to form a coating film, and reducing the humidity in the working environment may reduce the time required for the coating liquid to dry to form a film; in this case, the anhydrous ethanol is injected into the volatilization tank 17 as the volatile liquid, the humidity in the box 16 may be reduced after the anhydrous ethanol evaporates, thereby reducing the time required for the coating liquid on the work-pieces 2 to be coated to dry to form a film. Thus, the working efficiency of the coating apparatus 1 may be improved.

In some examples, the coating apparatus 1 may be provided with an ethanol monitor (not shown). In some examples, the ethanol monitor may be used to monitor ethanol gas concentration. For example, in some examples, it may be advantageous to increase the drying speed of the coating liquid to form a coating film when the concentration of the ethanol gas is within a predetermined range, the concentration of the ethanol gas in the tank body 16 may be monitored by the ethanol monitor, and when the concentration of the ethanol gas in the tank body 16 is not within the predetermined range, the concentration of the ethanol gas in the tank body 16 may be adjusted so that the concentration of the ethanol gas in the tank body 16 is within the predetermined range, thereby advantageously increasing the drying speed of the coating liquid to form the coating film.

In some examples, the drive motor of the drive mechanism 15 may be disposed outside the tank body 16. Sparks may be generated during operation of the drive motor and the anhydrous ethanol has flammable characteristics, in which case safety hazards may be reduced by placing the drive motor outside the tank body 16.

In some examples, the tank 16 may have a vent (not shown). In this case, the vent may be opened or closed depending on the actual situation. For example, when the concentration of ethanol gas in the tank body 16 exceeds a safe value, the vent may be opened to reduce the concentration of ethanol gas in the tank body 16.

In some examples, the vent may be fan-shaped or mesh-shaped (not shown). In some examples, the vent may be connected to a suction device (not shown).

In some examples, the coating liquid may be a high viscosity material. In some examples, the coating liquid may have a viscosity greater than water.

In some examples, the film coating apparatus 1 may be provided with a temperature regulator (not shown). In this case, The temperature of the drying environment of the work-piece 2 to be coated may be adjusted by the temperature regulator to adjust the coating film formation speed of the coating liquid on the work-piece 2 to be coated, so that it may be advantageous to improve the coating efficiency. For example, the temperature of the drying environment of the work-pieces 2 to be coated may be adjusted to 25° C., 30° C., 35° C. or 40° C. by the temperature regulator.

As described above, in the present disclosure, the coating apparatus 1 may coat the work-pieces 2 to be coated and may advantageously improve the uniformity of the coating.

This embodiment discloses a batch coating method for improving uniformity, coating method is applied to the above-described coating apparatus 1.

Figure 11:
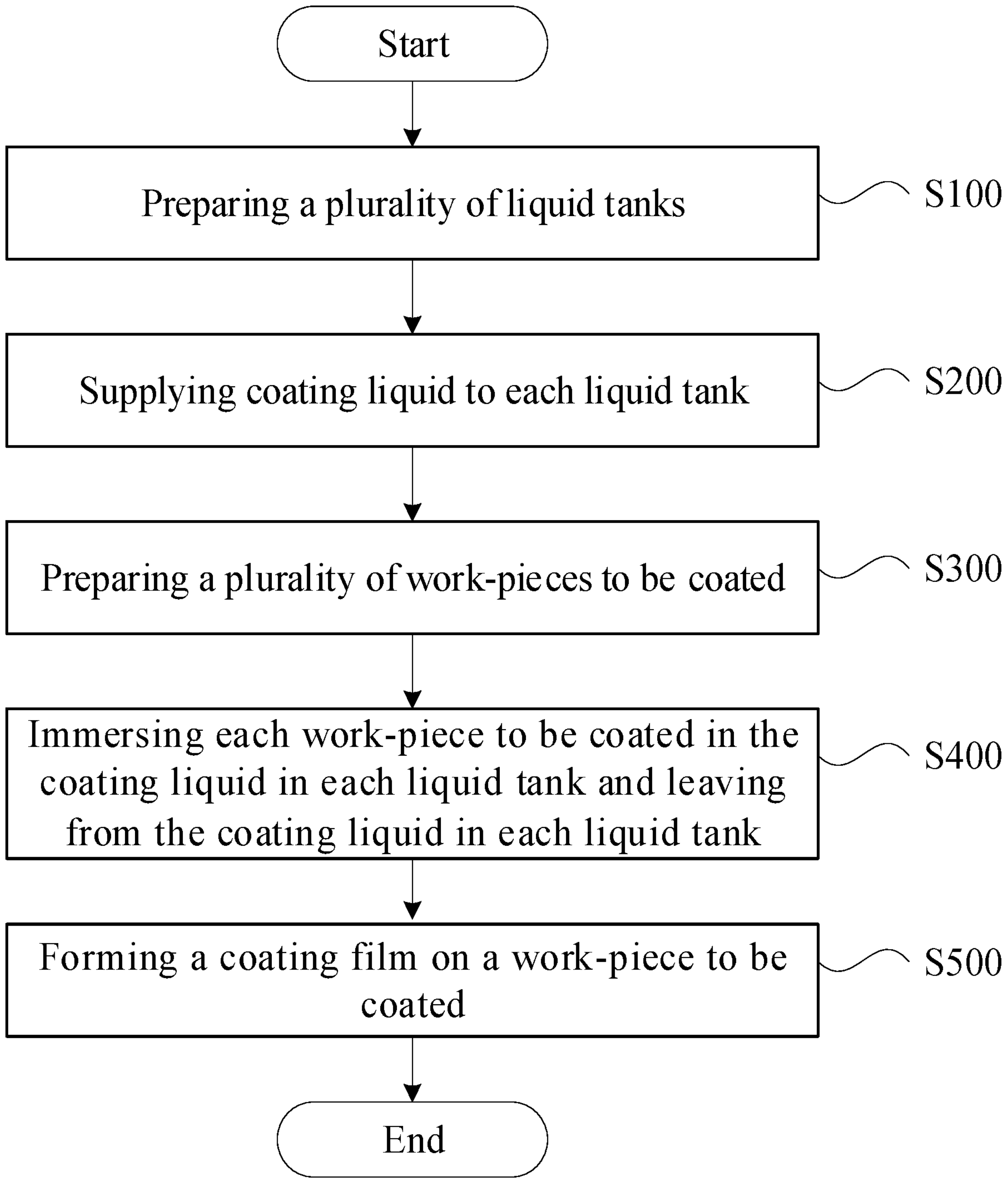
FIG. 11 is a schematic flow chart showing a batch coating method according to an example of the present disclosure.

FIG. 11 is a schematic flow chart shows a batch coating method related to the example of the present disclosure.

Hereinafter, with reference to FIG. 11, a detailed description of the flow diagram of the batch coating method related to the example of the present disclosure.

In the present embodiment, as shown in FIG. 11, the batch coating method may include: preparing a plurality of liquid tanks 121 (step S100); supplying a coating liquid to each of the liquid tanks 121 (step S200); preparing a plurality of work-pieces 2 to be coated (step S300); immersing each work-piece 2 to be coated in the coating liquid in each of the liquid tanks 121 and leaving from the coating liquid in each of the liquid tanks 121 (step S400); a coating film is formed on each work-pieces 2 to be coated (step S500). Thus, it is possible to coat a plurality of work-pieces to be coated in batches and it is possible to facilitate improvement in the uniformity of the coating.

In some examples, the order of execution of steps S100, S200, S300, S400, and S500 may not be required. For example, step S100 and step S300 may be performed simultaneously.

In some examples, the shape of the plurality of liquid tanks 121 may be the same in step S100. As a result, it is possible to coat a plurality of work-pieces to be coated in batches and it is advantageous to improve the uniformity of the coating. In some examples, the coating apparatus 1 according to the example of the present disclosure may prepare a plurality of liquid tanks 121 with the same shape.

In some examples, in step S100, the liquid tank 121 may include the liquid tank body portion 1211 having the accommodating space. In some examples, the liquid tank 121 may include an opening portion 1212 connected to the tank body portion 1211. In some examples, the cross-sectional area of the opening portion 1212 may be greater than the cross-sectional area of the tank body portion 1211. Thus, it is possible to improve the utilization rate of the coating liquid.

In some examples, in step S100, the plurality of liquid tanks 121 may be arranged at the same level. In some examples, the liquid tanks 121 located on the same plane may be prepared by the coating apparatus 1 according to the example of the present disclosure. Thus, it is possible to advantageously improve the uniformity of the coating.

In some examples, a coating liquid may be prepared before step S200. In some examples, the coating liquid may be stirred to obtain a uniform coating liquid. Thus, it is possible to advantageously improve the uniformity of the coating.

In some examples, step S200 may be performed after preparing the coating liquid. In step S200, a predetermined volume of coating liquid may be respectively supplied to each of the liquid tanks 121. In some examples, a predetermined volume of coating liquid may be supplied to each of the liquid tanks 121 by the coating apparatus 1 according to the example of the present disclosure. Thus, it is possible to advantageously improve the uniformity of the coating.

In some examples, in step S200, the volume of the coating liquid contained in each of the liquid tanks 121 may be uniform. Thus, it is possible to advantageously improve the uniformity of the coating.

In some examples, in step S200, a predetermined volume of the coating liquid may be respectively supplied to each of the liquid tanks 121 at the same time.

In some examples, the number of the plurality of work-pieces 2 to be coated may be the same as the number of the liquid tanks 121 in step S300.

In some examples, step S300 may be performed after supplying the coating liquid to the liquid tanks 121. In step S300, the plurality of work-pieces 2 to be coated may be fixed.

In some examples, the plurality of work-pieces 2 to be coated may be fixed at the same horizontal plane. Thus, it is possible to advantageously improve the uniformity of the coating. In some examples, the plurality of work-pieces 2 to be coated may be fixed at the same level by the coating apparatus 1 according to the example of the present disclosure.

In some examples, in step S300, the plurality of fixed work-pieces 2 to be coated may be aligned with the respective liquid tanks 121. For example, the plurality of liquid tanks 121 may be arranged at the same horizontal plane, and the plurality of work-pieces 2 to be coated may be fixed at the same horizontal plane and positioned directly above the liquid tanks 121 so that the plurality of fixed work-pieces 2 to be coated are aligned with the liquid tanks 121. In some examples, the plurality of fixed work-pieces 2 to be coated may be aligned with each of the liquid tanks 121 by the coating apparatus 1 according to the example of the present disclosure.

In some examples, step S400 may be performed after preparing the coating liquid and the work-pieces 2 to be coated. In step S400, each of the work-pieces 2 to be coated may be simultaneously immersed in the coating liquid in each of the liquid tanks 121 and left from the coating liquid in each of the liquid tanks 121 respectively. Thus, it is possible to advantageously improve the uniformity of the coating.

In some examples, in step S400, each of the work-pieces 2 to be coated may be aligned with each of the liquid tanks 121 before the work-pieces 2 to be coated are immersed in the coating liquid in the liquid tanks 121. In some examples, it is possible to align each work-piece 2 to be coated with each of the liquid tanks 121 by the coating apparatus 1 according to the example of the present disclosure.

In some examples, in step S400, each of the work-pieces 2 to be coated may immerse in the coating liquid and stay in the coating liquid for a certain time (for example, may stay for 30 s, 1 min, 2 min, or 5 min) and then leave the coating liquid. After the work-pieces 2 to be coated are immersed in the coating liquid, the duration of the immersion may be called as a residence time.

In some examples, the residence time may be adjusted according to the properties of the coating liquid. For example, when the viscosity of the coating liquid is high, the residence time may be appropriately adjusted, such as increasing the residence time from 1 min to 5 min.

In some examples, the residence time of the coating liquid immersed in each of the liquid tanks 121 for each work-piece 2 to be coated may be the same. the coating apparatus 1 related to the example of the present disclosure may make the residence time of each work-piece 2 to be coated immersed in the coating liquid may be the same.

In some examples, in step S400, the speed of each of the work-pieces 2 to be coated immersed in the coating liquid may be the same. For example, in some examples, the work-pieces 2 to be coated may be immersed in the film coating liquid by dipping the work-pieces 2 to be coated downward, and the speed of dipping the work-pieces 2 to be coated downward may be the same for each work-piece 2 to be coated. Thus, it is possible to advantageously improve the uniformity of the coating. In some examples, the speed of each work-piece 2 to be coated immersed in the film coating liquid may be the same by the coating apparatus 1 according to the example of the present disclosure.

In some examples, in step S400, the depth of each of the work-pieces 2 to be coated immersed in the coating liquid may be the same. Thus, it is possible to advantageously improve the uniformity of the coating. In some examples, the depth of each work-piece 2 to be coated immersed in the coating liquid may be the same by the coating apparatus 1 according to the example of the present disclosure.

In some examples, in step S400, the area 23 to be coated may be completely immersed in the coating liquid while each of the work-pieces 2 to be coated is immersed in the coating liquid.

In some examples, in step S400, the speed of each of the work-pieces 2 to be coated leaving from the coating liquid may be the same. For example, in some examples, the work-pieces 2 to be coated may be made to leave the coating liquid by upwardly lifting the work-pieces 2 to be coated, and the upward lifting speed of each work-piece 2 to be coated may be the same. Thus, it is possible to advantageously improve the uniformity of the coating. In some examples, the speed of the respective work-pieces 2 to be coated immersed in the coating liquid may be the same by the coating apparatus 1 according to the example of the present disclosure.

In some examples, step S500 may be performed after the work-pieces 2 to be coated left from the coating liquid. In step S500, the coating liquid on the work-pieces 2 to be coated may be dried over a period of time to form the coating film on the work-pieces 2 to be coated. The time from the time when the work-pieces 2 to be coated leave the film coating liquid to the time when the coating liquid dries to form a coating film on the work-pieces 2 to be coated may be called as a drying time.

In some examples, in step S500, the temperature of the drying environment of the work-pieces 2 to be coated may be adjusted. In this case, the speed at which the coating liquid on the work-pieces 2 to be coated form a coating film may be adjusted by adjusting the temperature, whereby it is possible to favorably improve the efficiency of the coating. In some examples, the temperature of the drying environment of a plurality of work-pieces 2 to be coated may be adjusted by the coating apparatus 1 according to the example of the present disclosure. For example, the temperature of the drying environment of the work-pieces 2 to be coated may be adjusted to 25° C., 30° C., 35° C. or 40° C. by the temperature regulator.

In some examples, step S400 may be performed to form a coating film on the work-pieces 2 to be coated. In other words, steps S400 and S500 may be performed cyclically.

In some examples, the number of cycles of steps S400 and S500 may be 1, 2, 3, 4, 5, or 6.

In some examples, the number of cycles may be adjusted according to actual needs. For example, in some examples, the coating film having a thickness of 1 mm on the work-pieces 2 to be coated may be formed after performing 1 cycle of the steps S400 and S500, and a coating film having a thickness of 2 mm on the work-pieces 2 to be coated may be formed after performing 2 cycles of the steps S400 and S500. In this case, the thickness of the coating film formed on the surface of the work-pieces 2 to be coated may be adjusted by adjusting the number of cycles, whereby the coating film of a predetermined thickness may be formed on the film work-pieces 2 to be coated.

As described above, in the present disclosure, the batch coating method may be used to coat the work-pieces 2 to be coated.

Various embodiments of the disclosure may have one or more of the following effects. In some embodiments, the disclosure may provide a batch coating apparatus and a batch coating method which helps to improve the uniformity of the coating. In other embodiments, by setting a plurality of liquid tanks with the same shape and making the depth of each work-piece immersed in the coating liquid consistent, batch coating may methods be carried out on the work-pieces to be coated and it may be beneficial to improve the uniformity of the coating. In further embodiments, by providing a plurality of fixing portions in the fixing mechanism and arranging a plurality of liquid tanks in the liquid holding mechanism, it is possible to coat the work-pieces to be coated in batches. Additionally, by arranging the liquid tanks to have the same shape and contain a predetermined volume of the coating liquid, the work-pieces to be coated fixed to the fixing mechanism are immersed into the coating liquid in the liquid tanks and left from the coating liquid in the liquid tanks, the work-pieces to be coated forming a predetermined thickness coating film, thereby it is possible to advantageously improve the uniformity of the coating.

Many different arrangements of the various components depicted, as well as components not shown, are possible without departing from the spirit and scope of the present disclosure. Embodiments of the present disclosure have been described with the intent to be illustrative rather than restrictive. Alternative embodiments will become apparent to those skilled in the art that do not depart from its scope. A skilled artisan may develop alternative means of implementing the aforementioned improvements without departing from the scope of the present disclosure.

It will be understood that certain features and subcombinations are of utility and may be employed without reference to other features and subcombinations and are contemplated within the scope of the claims. Unless indicated otherwise, not all steps listed in the various figures need be carried out in the specific order described.

The disclosure claimed is:

1. A batch coating apparatus, comprising a fixing mechanism, a liquid holding mechanism, a liquid injection mechanism and a control device, wherein:

the fixing mechanism comprises a plurality of fixing portions for fixing work-pieces to be coated;

the liquid holding mechanism comprises a plurality of liquid tanks arranged side by side, wherein, the plurality of liquid tanks have a same shape for holding a coating liquid, the plurality of liquid tanks comprise a tank body portion having an accommodating space and an opening portion connected to the tank body portion, a cross-sectional area of the opening portion is greater than that of the tank body portion, and the liquid holding mechanism and the fixing mechanism are relatively movable;

the liquid injection mechanism comprises a liquid storage portion and an infusion portion, wherein, the liquid storage portion is configured to accommodate the coating liquid, the infusion portion is connected with the liquid storage portion, the infusion portion is configured to supply the coating liquid, and the liquid injection mechanism and the liquid holding mechanism are relatively movable;

the control device is configured to control at least one of a relative movement between the fixing mechanism and the liquid holding mechanism and a relative movement between the liquid holding mechanism and the liquid injection mechanism;

the control device is configured to control the liquid injection mechanism to supply the coating liquid via the infusion portion;

when coating the work-pieces to be coated fixed to the fixing mechanism, the control device controls a relative movement between the liquid injection mechanism and the liquid holding mechanism so that the infusion portion aligns with the plurality of liquid tanks, and the control device controls the infusion portion to supply a predetermined volume of coating liquid into the plurality of liquid tanks; and the control device controls the liquid holding mechanism and the fixing mechanism to relatively move so that the work-pieces to be coated fixed to the fixing mechanism are immersed into the coating liquid in the plurality of liquid tanks and left from the coating liquid in the plurality of liquid tanks, thereby forming a coating film of a predetermined thickness on the work-pieces to be coated.

2. The batch coating apparatus according to claim 1, wherein:

the predetermined volume is not greater than a volume of the accommodating space; and the predetermined volume is less than or equal to 100 μL.

3. The batch coating apparatus according to claim 1, wherein:

the opening portion comprises a funnel shape tapered from an upper end to a lower end; and the tank body portion is connected to the lower end of the opening portion.

4. The batch coating apparatus according to claim 1, wherein:

the tank body portion comprises a body area and a bottom area;

the body area comprises a cylindrical shape; and the bottom area comprises a hemispherical shape.

5. The batch coating apparatus according to claim 1, wherein the plurality of liquid tanks of the liquid holding mechanism are arranged in an array.

6. The batch coating apparatus according to claim 1, further comprising a liquid injection chamber and a liquid coating chamber, wherein:

in the liquid injection chamber, the liquid injection mechanism supplies the coating liquid to the liquid holding mechanism; and in the liquid coating chamber, the work-pieces to be coated fixed to the fixing mechanism are immersed in the coating liquid in the plurality of liquid tanks.

7. The batch coating apparatus according to claim 1, wherein:

the liquid injection mechanism further comprises a piston disposed in the liquid storage portion;

the liquid injection mechanism moves along a lengthwise direction of the liquid storage portion;

the piston is connected to an actuating part;

the actuating part actuates the piston to move in the lengthwise direction of the liquid storage portion;

the actuating part is connected to the control device and is controlled by the control device; and the control device controls an actuating distance and an actuating direction of the actuating part to supply a predetermined volume of the coating liquid to the plurality of liquid tanks via the infusion portion.

8. The batch coating apparatus according to claim 1, wherein:

the work-piece to be coated comprises a first fixing area, a second fixing area, and a coating area;

the coating area is coated with the coating liquid substantially located on a same plane and successively connected;

the first fixing area and the second fixing area are in a shape of a sheet; and the coating area is in a shape of a needle.

9. The batch coating apparatus according to claim 8, wherein:

the fixing portions comprise a first locating slot adapted to the first fixing area and a second locating slot adapted to the second fixing area;

the first locating slot cooperates with the first fixing area to limit an area to be coated in a vertical direction;

the second locating slot cooperates with the second fixing area to limit an area to be coated in a horizontal direction; and the coating area is limited in a predetermined position.

* * * * *